United States Patent
Matyushev et al.

(10) Patent No.: US 12,325,507 B2
(45) Date of Patent: Jun. 10, 2025

(54) CARGO-BAY LAYOUT FOR BLENDED-WING-BODY AIRCRAFT

(71) Applicant: Natilus Inc., San Francisco, CA (US)

(72) Inventors: Aleksey Matyushev, San Diego, CA (US); Anatoly Y. Starikov, El Cajon, CA (US)

(73) Assignee: Natilus Inc., San Diego, CA (US)

( * ) Notice: Subject to any disclaimer, the term of this patent is extended or adjusted under 35 U.S.C. 154(b) by 0 days.

(21) Appl. No.: 17/553,302

(22) Filed: Dec. 16, 2021

(65) Prior Publication Data

US 2023/0192270 A1 Jun. 22, 2023

(51) Int. Cl.
*B64C 1/22* (2006.01)
*B64C 1/14* (2006.01)
*B64C 39/02* (2023.01)
*B64C 39/10* (2006.01)
*B64U 10/25* (2023.01)

(52) U.S. Cl.
CPC .............. *B64C 1/22* (2013.01); *B64C 1/1415* (2013.01); *B64C 39/024* (2013.01); *B64C 39/10* (2013.01); *B64C 2039/105* (2013.01); *B64U 10/25* (2023.01)

(58) Field of Classification Search
CPC ....... B64C 1/22; B64C 1/1415; B64C 39/024; B64C 39/10; B64C 2039/105; B64U 10/25
See application file for complete search history.

(56) References Cited

U.S. PATENT DOCUMENTS

| | | | |
|---|---|---|---|
| 7,093,798 B2 | 8/2006 | Whelan | |
| 8,302,908 B1 | 11/2012 | Kismarton | |
| 9,452,817 B1* | 9/2016 | Sankrithi | B64C 1/00 |
| 10,899,451 B2* | 1/2021 | Saint-Marc | B64D 11/003 |
| 2003/0052228 A1* | 3/2003 | Sankrithi | B64C 39/04 |
| | | | 244/119 |
| 2003/0057326 A1* | 3/2003 | Medina | B64D 9/00 |
| | | | 244/137.1 |
| 2011/0121130 A1* | 5/2011 | Odle | B64C 1/22 |
| | | | 244/36 |
| 2016/0311516 A1* | 10/2016 | Sankrithi | B64D 11/00 |
| 2020/0207476 A1 | 7/2020 | Whitlock | |
| 2020/0307789 A1* | 10/2020 | Princen | B64C 39/10 |
| 2021/0114723 A1* | 4/2021 | Wittmaak, Jr. | B64C 5/02 |

FOREIGN PATENT DOCUMENTS

WO WO-2018209428 A1 * 11/2018 ........... B64C 1/0009

OTHER PUBLICATIONS

Nickol (doc. "Hybrid Wing Body Configuration System Studies") (Year: 2009).*
Gatto. (doc. "Hardened Luggage Container Design Survey"). (Year: 1993).*
Ikeda (doc. "Aerodynamic Analysis of a Blended-Wing-Body Aircraft Configuration". (Year: 2006).*
Hybrid Wing Body Configuration System Studies prior art date.*

(Continued)

*Primary Examiner* — Assres H Woldemaryam (57) ABSTRACT

In one embodiment, an aircraft includes a blended wing body (BWB) and a cargo bay having a polygonal shape. A longitudinal centerline of the aircraft intersects a vertex of the polygonal shape and an interior angle of the vertex.

26 Claims, 10 Drawing Sheets

(56) References Cited

OTHER PUBLICATIONS

Liebeck : "Design of the Blended Wing Body Subsonic Transport" (Year: 2004).*
"Blended Wing Body—A potential new aircraft design," https://www.nasa.gov/centers/langley/news/factsheets/FS-2003-11-81-LaRC.html#:~:text=Blended%20Wing%20Body%20%E2%80%93%20A%20potential%20new%20aircraft%20design&text=The%20concept%20is%20called%20the,conventional%20tube%2Dand%20wing%20airframes (last updated Apr. 22, 2008).
"Hybrid Wing Body Configuration System Studies," Craig L. Nickol and Linwood A. McCullers, $47^{th}$ AIAA Aerospace Sciences Meeting Including the New Horizons Forum and Aerospace Exposition, Jan. 5-8, 2009, Orlando, Florida, 2009.
"Conceptual Design of Blended Wing Body Business Jet Aircraft," by Taufiq Mulyanto and M. Luthfi Imam Nurhakim, Journal of KONES Powertrain and Transport, vol. 20, No. 4, 2013.
"Optimzation of Revenue Space of a Blended Wing Body," by Jörg Fuchte, Till Pfeiffer, Pier Davide Ciampa, Björn Nagel, and Volker Gollnick, $29^{th}$ Congress of the International Council of the Aeronautical Sciences, St. Petersburg, Russia, Sep. 7-12, 2014.
"Multidisciplinary Overall Aircraft Design and Optimization of Blended Wing Body Configurations," by Arnault Tremolet, Julie Gauvrit-Ledogar, Loïc Brevault, Sébastien Defoort, and Frank Morel, $8^{th}$ European Conference for Aeronautics and Space Sciences (EUCASS), Jul. 1-4, 2019.
"Presentations by innovators Aleksey Matyushev of Natilus & Ed de Reyes of Sabrewing Aircraft Company," retrieved from https://www.youtube.com/watch?v=ytx7L7TkbD4 on Oct. 16, 2021.

\* cited by examiner

CARGO-BAY LAYOUT FOR BLENDED-WING-BODY AIRCRAFT

TECHNICAL FIELD

This disclosure generally relates to blended-wing-body (BWB) aircraft.

BACKGROUND

A BWB-aircraft design (which may also be known as a blended-body or hybrid-wing-body (HWB) aircraft design) may blend the body of an aircraft across a delta wing shape. The aircraft may have distinct wing and body structures that are blended together without a substantially clear division between them.

DESCRIPTION OF EXAMPLE EMBODIMENTS

Figure 1:
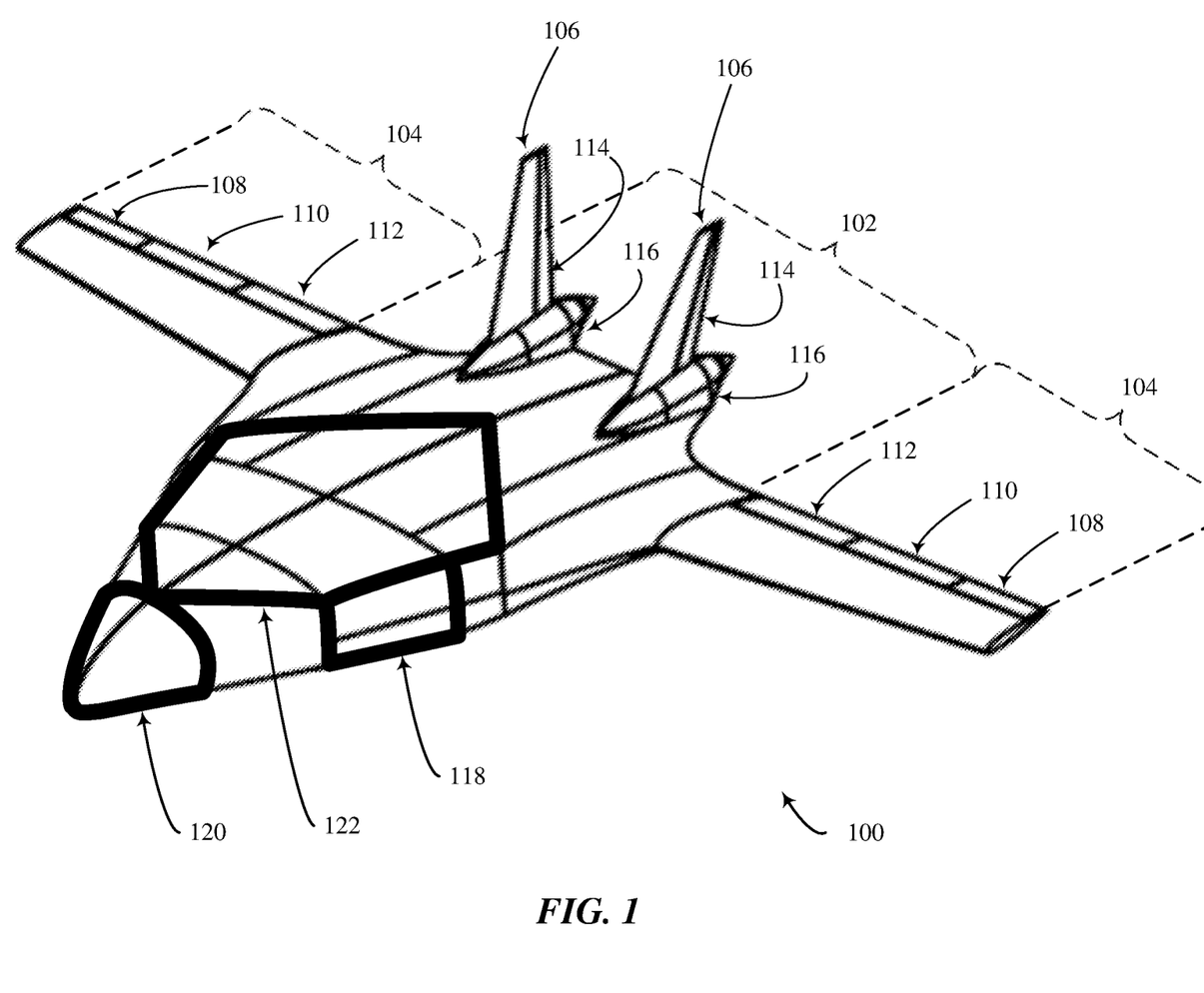
FIGS. 1-4 illustrate an example BWB aircraft.

FIG. 1 illustrates an example BWB aircraft 100. FIG. 1 provides a three-dimensional isometric view of aircraft 100 from above and toward the front of aircraft 100. Aircraft 100 may be considered to have a blended wing body because its body 102 is blended across a delta wing shape. In particular embodiments, a BWB-aircraft design facilitates superior airframe aerodynamics, lower structure weight, and reduced fuel burn and associated emissions. It may also increase volume capacity, enabling the aircraft to carry more volume compared with conventional aircraft of similar weight. In particular embodiments, a BWB-aircraft design reduces wetted area and form drag typically associated with a conventional wing-body junction. It may also facilitate a wider, airfoil-shaped body, which may enable more of the aircraft to generate lift and, in turn, reduce the size requirements of the wings and resulting drag. Although particular advantages of particular BWB-aircraft designs are described and illustrated herein, this disclosure contemplates any suitable advantages of any suitable BWB-aircraft designs. A BWB-aircraft design within the scope of this disclosure is not limited to the particular advantages specifically described or illustrated herein. Moreover, a BWB-aircraft design within the scope of this disclosure may provide all, some, or none of the advantages described or illustrated herein.

This disclosure contemplates any suitable BWB-aircraft design and is not limited to aircraft 100. For example, as discussed above, aircraft 100 may be considered to have a BWB because its body 102 is blended across a delta wing shape. In particular embodiments, an aircraft may be considered to have a BWB because it has distinct wing and body structures that are blended together without a substantially clear division between them. In particular embodiments, an aircraft may be considered to have a BWB because it does not have a substantially clear division between its wings and its body. In particular embodiments, an aircraft may be considered to have a BWB because at least some of its body provides lift. In particular embodiments, an aircraft without a distinct fuselage (which may be called a flying-wing aircraft) may be considered to have a BWB. In particular embodiments, an aircraft without distinct wings (which may be called a lifting-body aircraft) may be considered to have a BWB. Herein, reference to a BWB may encompass all, some, or none of the foregoing, where appropriate.

In the example of FIG. 1, wings 104 project horizontally and tails 106 project vertically from body 102. Aircraft 100 may have eight control surfaces spread out across wings 104 and tails 106. Each wing 104 may include an aileron 108, outboard elevon 110, and inboard elevon 112. Each tail 106 may include a rudder 114. Ailerons 108, which are located on the outboard sides of wing 104, may function as primary roll control. In the event of aileron failure, elevons 110 and 112 may be used as roll control. Pitch control may be handled by elevons 110 and 112. Elevons 110 and 112 may have almost identical pitch control and may be the same length in span. In cruise, inboard elevons 112 may be used alone for trim and pitch control. For take-off and landing, outboard elevons 110 and inboard elevons 112 may be used to trim aircraft 100 at high lift coefficients. In the event of a failure of an elevon 110 or 112 on a wing 104, other elevon 112 or 110 on wing 104 may function as primary pitch control. Rudders 114 may aid with directional maneuvering and crosswind take-offs and landings. In the event of a rudder failure, the remaining rudder may remain as primary directional control. The flight controls may be actuated via hydraulic actuators installed near the control surfaces. The hydraulic actuators may receive signals from mechanical controls in a cockpit of aircraft 100 or electrical signals from an autopilot sub-system of aircraft 100. Although particular aircraft controls are described and illustrated herein, this disclosure contemplates any aircraft controls.

In particular embodiments, the basic composite structure of aircraft 100 is a carbon-fiber sandwich core. The structure may be a tooled structure that is bonded together through primary and secondary cures. The TORAY 2510 prepreg system may be used as a baseline for most structures. This may include TORAY T700G carbon fiber and the 2510 resin system, which is formulated to be an out-of-autoclave process and uses low-energy curing. One or more locations of the core may include a half-inch or one-inch ROHACELL IG-F foam core or aluminum honeycomb. DYNEEMA sandwich construction may be used in particular sections of the upper skin of aircraft 100 to allow for satellite-communications (SATCOM) signal penetration. Body 102 of aircraft 100 may include frames and bulkheads that make up the interior structure, and they may be bonded to the upper and lower skins. Wings 104, tails 106, and the control surfaces may be made up of tooled spars, ribs, and skins. Frames and ribs may be bonded to lower skins in a primary cure and then closed out with the upper skins in a secondary cure. Various lightening or access holes may be provided throughout the airframe for ease of access and installation of systems. Although particular structures with particular manufacturing are described and illustrated herein, this disclosure contemplates suitable structures with any suitable manufacturing.

Aircraft 100 may include two turboprop aircraft engines 116 in a pusher configuration that each drive a propeller (not shown). Although a particular number of a particular type of aircraft engine in a particular configuration and in particular locations is described and illustrated herein, this disclosure contemplates any suitable number of aircraft engines; any suitable types of aircraft engine; any suitable configurations of aircraft engine; and any suitable locations of aircraft engines. As an example, a BWB aircraft may include one or more turbojet or turbofan engines. As another example, a BWB aircraft may include one or more aircraft engines that are each in a pull (or tractor) configuration or push-pull configuration. As another example, a BWB aircraft may include aircraft engines located on the body and at the rear of the aircraft (as in the example of FIG. 1). As another example, a BWB aircraft may include aircraft engines mounted on the wings of the aircraft or located where the wings of the aircraft join the body of the aircraft. As another example, a BWB aircraft may include aircraft engines with one or more portions that are located vertically inline with the body or the wings of the aircraft or that project above or below the body or the wings of the aircraft.

In particular embodiments, aircraft 100 includes landing gear (not shown) that may include two main wheels toward the rear of aircraft 100 and a nose wheel toward the front of aircraft 100. Although a particular BWB aircraft with particular landing gear in a particular configuration is described and illustrated herein, this disclosure contemplates any suitable BWB aircraft with any suitable landing gear in any suitable configuration. The landing gear may be retractable or fixed. The landing gear may provide at least a 15° tip-back angle between the main wheels and the propellers striking the ground. The aircraft hydraulic system may be the main source of power for gear retraction and the emergency gear-release system may be a gravity drop. The nose wheel may be used to steer aircraft 100 and may be controlled through mechanical linkages and sectors connected to rudder pedals for a human pilot. Rudder pedals may sit approximately 60 inches in front of the nose wheel, so that a linkage through cables is routed underneath the floorboards of aircraft 100 to a cargo-loading system of aircraft 100. Nose-wheel steering may operate through an electrical actuator interconnected to the mechanical linkage installed to the nose wheel. Although particular operation and control of particular landing gear of a particular BWB aircraft are described and illustrated herein, this disclosure contemplates any suitable operation and control of any suitable landing gear of any suitable BWB aircraft.

FIG. 1 shows a superimposed outline of an example door 118 through which cargo may be loaded onto aircraft 100. Door 118 may be located on the left-hand side of aircraft 100. Door 118 may be a clamshell door, including an upper panel and a lower panel that open and close vertically. Door 118 may be 50 inches high and 69 inches wide. Door 118 may facilitate both container loading (such as for example LD3-45 containers) and bulk loading. Although a particular BWB aircraft with a single door is described and illustrated herein, this disclosure contemplates any suitable BWB aircraft having any suitable number of doors. Moreover, although a particular BWB aircraft with a particular door for particular cargo in a particular location with particular dimensions and a particular configuration is described and illustrated herein, this disclosure contemplates any suitable BWB aircraft with any suitable doors for any suitable cargo in any suitable locations with any suitable dimensions and any suitable configurations.

FIG. 1 also shows a superimposed outline of an example cockpit 120 located at the front of the fuselage of aircraft 100. Cockpit 120 may provide a standard control panel and seat for a human pilot. A control panel in cockpit 120 may be a combination of standard avionics with supplemental screens and breakers to monitor flight data and control an autopilot sub-system of aircraft 100. Although a particular BWB aircraft with a particular cockpit in a particular location is described and illustrated herein, this disclosure contemplates any suitable BWB aircraft with any suitable cockpit in any suitable location. This disclosure also contemplates any suitable BWB aircraft without a cockpit. Aircraft 100 may be unpressurized, where appropriate. Aircraft 100 may be entirely or partially controlled by one or more human pilots on board aircraft 100, where appropriate. Aircraft 100 may be entirely or partially controlled remotely by one or more human pilots or computer systems not on board aircraft 100, where appropriate. Aircraft 100 may operate entirely or partially autonomously, where appropriate. This disclosure contemplates any suitable combination of onboard control and remote control of any suitable BWB aircraft. This disclosure also contemplates any suitable combination of human control and autonomous operation of any suitable BWB aircraft.

In particular embodiments, aircraft 100 includes the following sub-systems: (1) a satellite-communication sub-system that provides dual redundant satellite communication at approximately 122 kbps or less; (2) a ground-control-station (GCS) sub-system with software that reduces pilot workload and training and enables a single operator to control multiple (e.g. three) aircraft simultaneously; (3) a cloud-based-integration sub-system with software that manages pilot workload and communications with the aircraft, plots routes, and routes communication with air traffic control (ATC); and (4) an onboard autopilot sub-system that provides dual redundant autopilot managing aircraft systems, communications, and flight. Although a particular BWB aircraft with particular sub-systems is described and illustrated herein, this disclosure contemplates any suitable BWB aircraft with any suitable sub-systems.

In particular embodiments, aircraft 100 includes a command-and-control (C2) sub-system with redundancy that interfaces with existing ATC and airspace architectures. The C2 link may rely entirely on SATCOM services, and there may be two bands on board aircraft 100: (1) Ku band and (2) L band. The Ku band may be primary and used for satellite communications with INMARSAT or IRIDIUM satellite services, with a data rate of approximately 122 kbps or less and latency between approximately one second and approximately one and a half seconds between command and feedback. The Ku band may be used for primary telemetry and may support voice and data. In particular embodiments, the data rate may be kept relatively low to reduce operating bandwidth costs. The L band may be secondary, with a bandwidth of approximately 120 kbs or less. Aircraft 100 may include a dedicated antenna and modem for each band to provide redundancy. The antennae may be located behind cockpit 120 to provide an unobstructed view. The antennae may have a visibility of 360° laterally and up to 85° vertically. The antennae may have limited visibility during banking, and to address this the autopilot sub-system may be limited to a maximum banking angle of 15°. Aircraft 100 may be a purpose-built unmanned aerial vehicle (UAV) without a radome. To reduce reflection of SATCOM signals on carbon structures of aircraft 100, DYNEEMA may be used in certain portions of the top skin of aircraft 100, which may reduce obstruction of C2 signals.

Aircraft 100 may be an optionally piloted aircraft (OPA) that can be flown by either a human pilot on board aircraft 100 (e.g. from cockpit 120) or remotely through a GCS. Aircraft 100 may be an OPA under FAA Order No. 8106.34D, Airworthiness Certification of Unmanned Aircraft Systems and Optionally Piloted Aircraft (Sep. 8, 2017). Aircraft 100 may be fully autonomous and remotely operated. Aircraft 100 may incorporate a remotely piloted aircraft system (RPAS) that enables a human pilot to operate one or more aircraft simultaneously.

Aircraft 100 may include an onboard autopilot sub-system with a primary autopilot and a secondary autopilot providing redundancy. The two autopilots may be coupled with two different SATCOM links. The primary autopilot may be responsible for flight, and the secondary autopilot board may monitor the health of the primary autopilot and be able to deploy a ballistic parachute to terminate flight. The autopilot sub-system may monitor aircraft 100 and communicate with one or more GCSs. In particular embodiments, a human pilot on board aircraft 100 may disengage the autopilot sub-system and manually take control of aircraft 100. In particular embodiments, a human pilot on board aircraft 100 may override remote-pilot commands at any time. In particular embodiments, the autopilot sub-system has a breaker that must be engaged in cockpit 120 for the autopilot sub-system to be able to send signals to servos.

In particular embodiments, aircraft 100 includes a ballistic parachute system. In the event of autopilot failure, lost link, or structural failure, the ballistic parachute may be activated. The ballistic parachute may be mounted in the aft section of the fuselage. The ballistic parachute may be capable of slowing aircraft 100 from 235 knots to 104 knots, reducing velocity and potential energy and, in turn, reducing property damage on the ground.

FIG. 1 also shows a superimposed outline of an example cargo bay 122 in aircraft 100, which is described more fully below.

Figure 2:
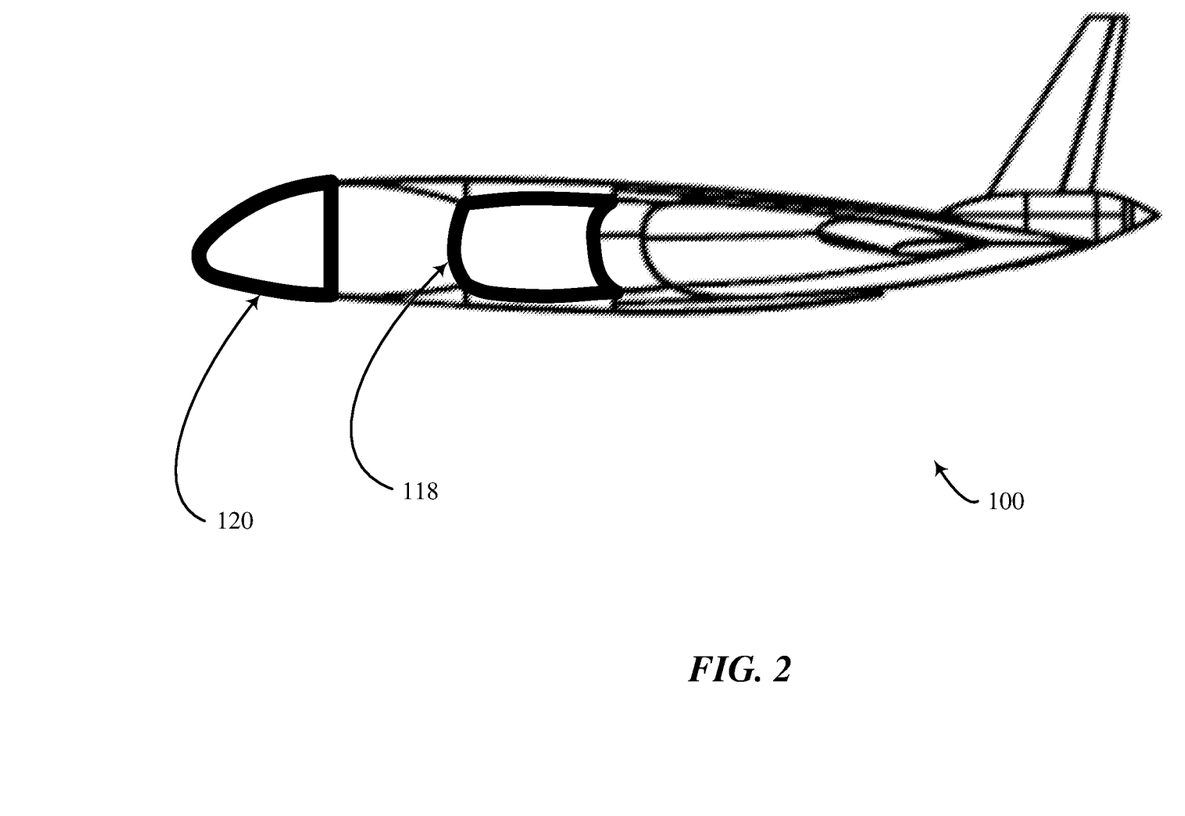
Figure 3:
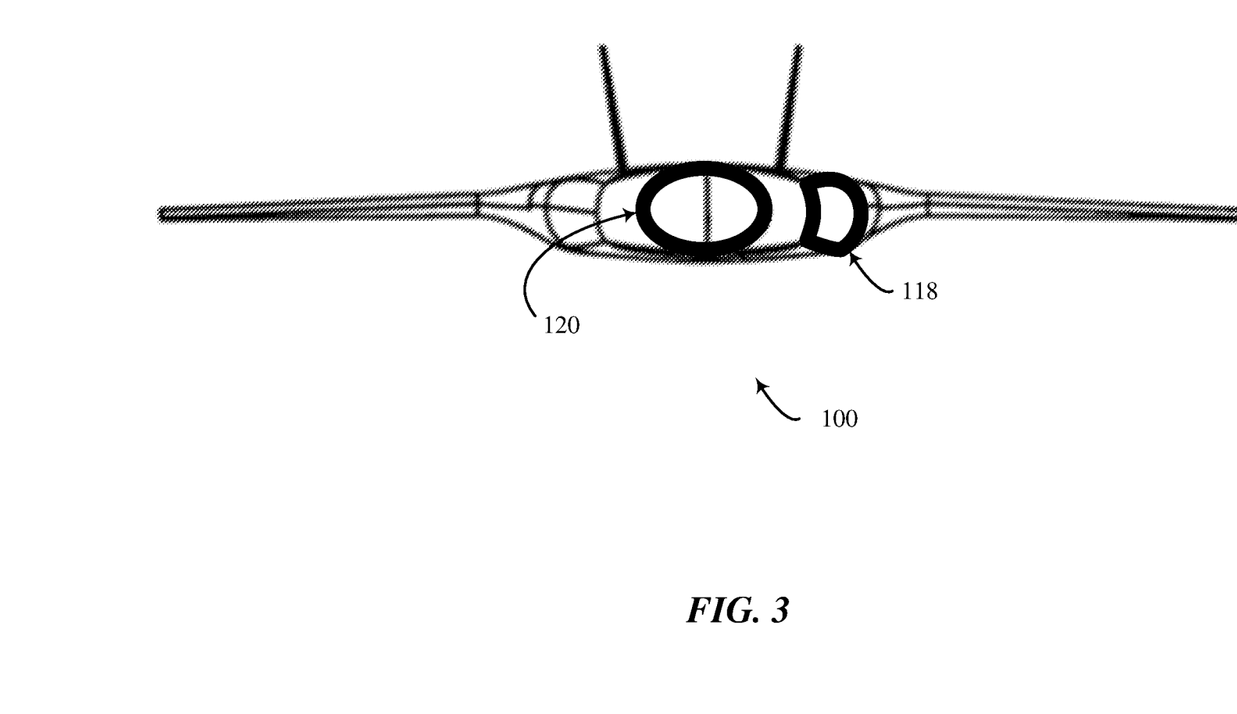
Figure 4:
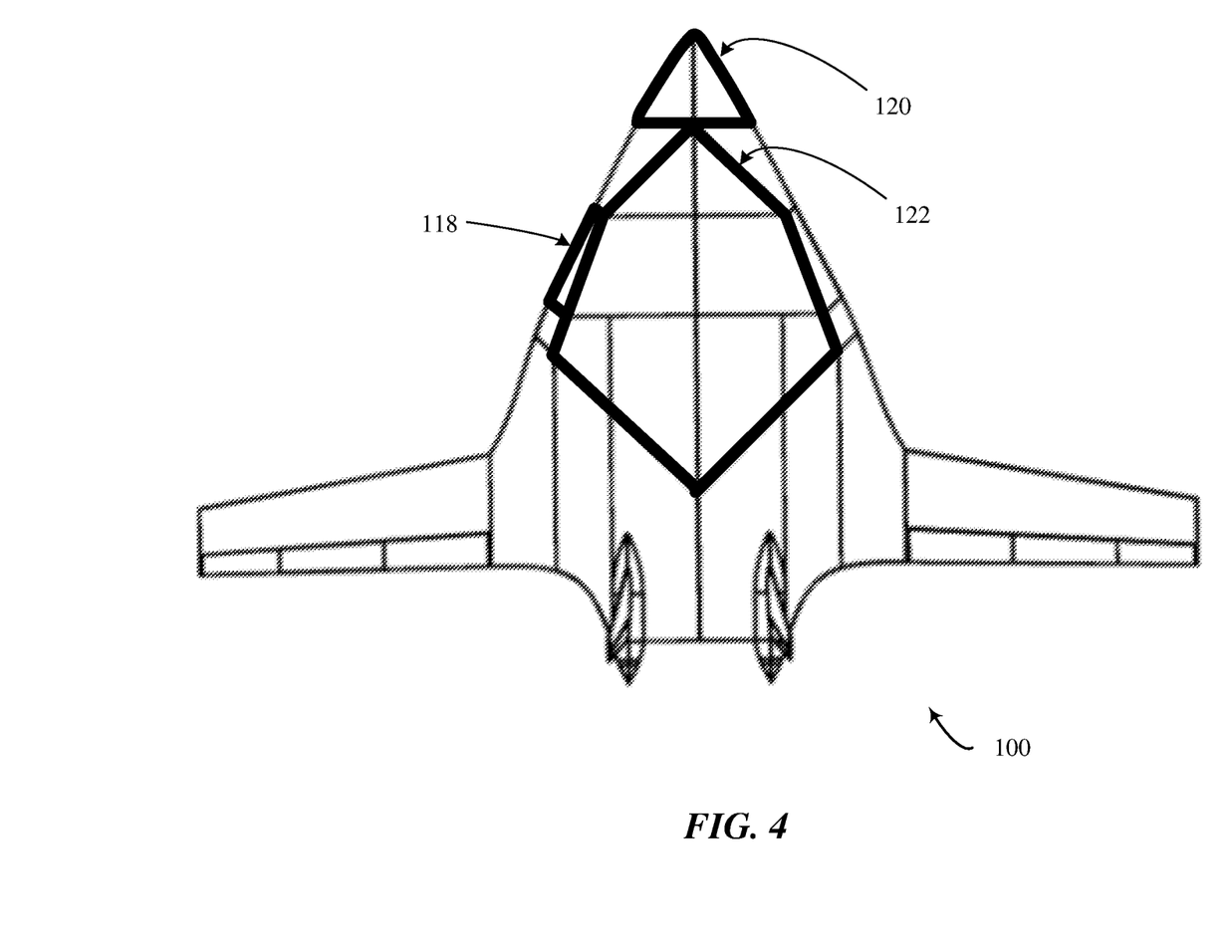

FIGS. 2-4 further illustrate example aircraft 100. FIG. 2 provides a two-dimensional orthographic side view of aircraft 100. FIG. 3 provides a two-dimensional orthographic front view of aircraft 100. FIG. 4 provides a two-dimensional orthographic top view of aircraft 100. Although a particular BWB aircraft is described and illustrated herein, this disclosure contemplates any suitable BWB aircraft.

Figure 5:
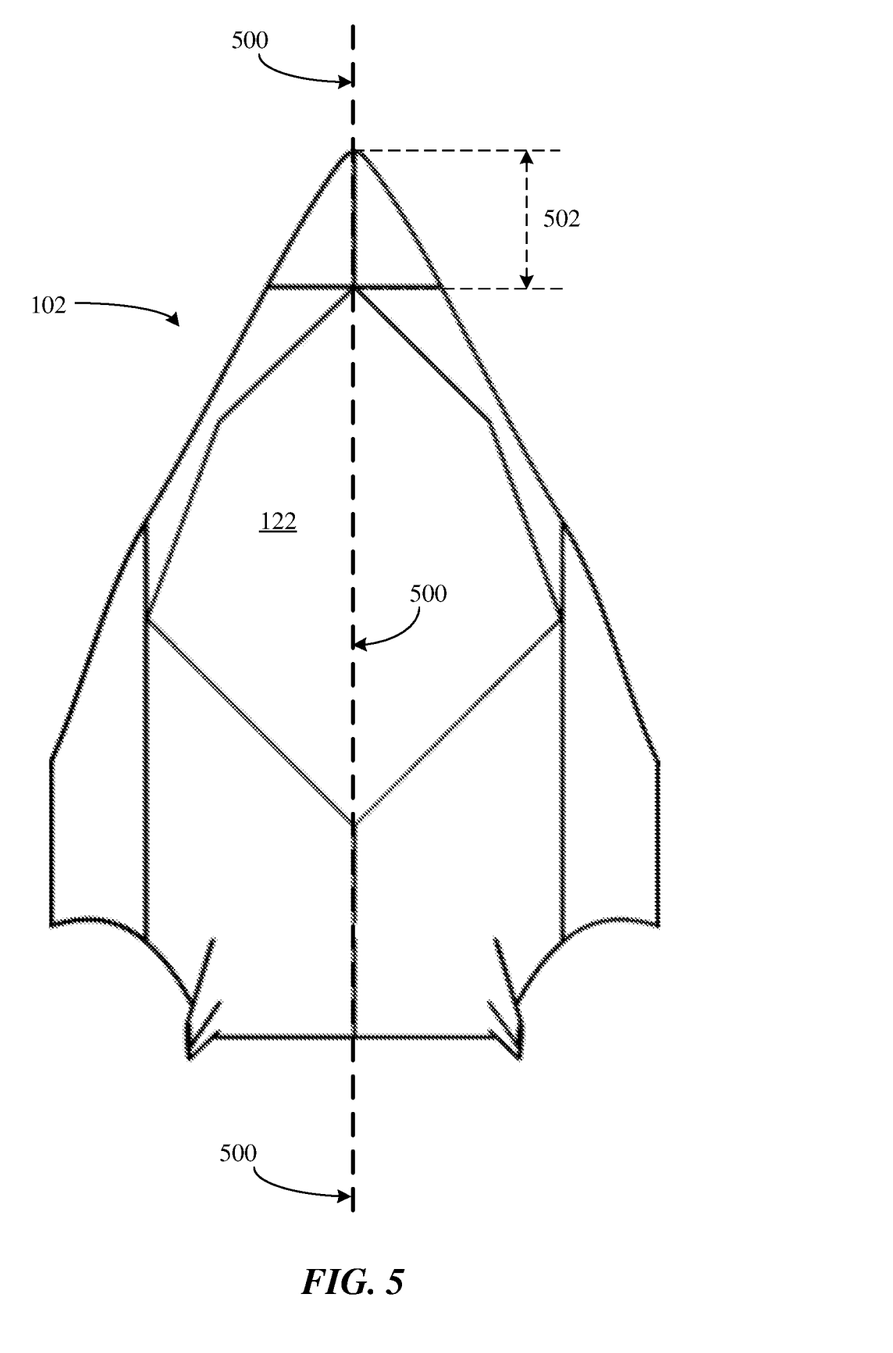
FIGS. 5-7 illustrates an example cargo bay of the example BWB aircraft.

FIG. 5 illustrates example cargo bay 122 of example aircraft 100. FIG. 5 provides a two-dimensional orthographic top view of body 102 of aircraft 100 with cargo bay 122. In the example of FIG. 11, cargo bay 122 has a polygonal shape with six edges and six vertices and a longitudinal centerline 500 of aircraft 100 intersects cargo bay 122. Longitudinal centerline 500 is shown for purposes of explanation only and is not necessarily a structure of aircraft 100. Distance 502 between the nose of aircraft 100 and a vertex of cargo bay 122 closest to the nose may be approximately 90.9 inches. Although a particular BWB aircraft with a particular cargo bay with a particular shape is described and illustrated, this disclosure contemplates any suitable BWB aircraft with any suitable cargo bay with any suitable shape.

Figure 6:
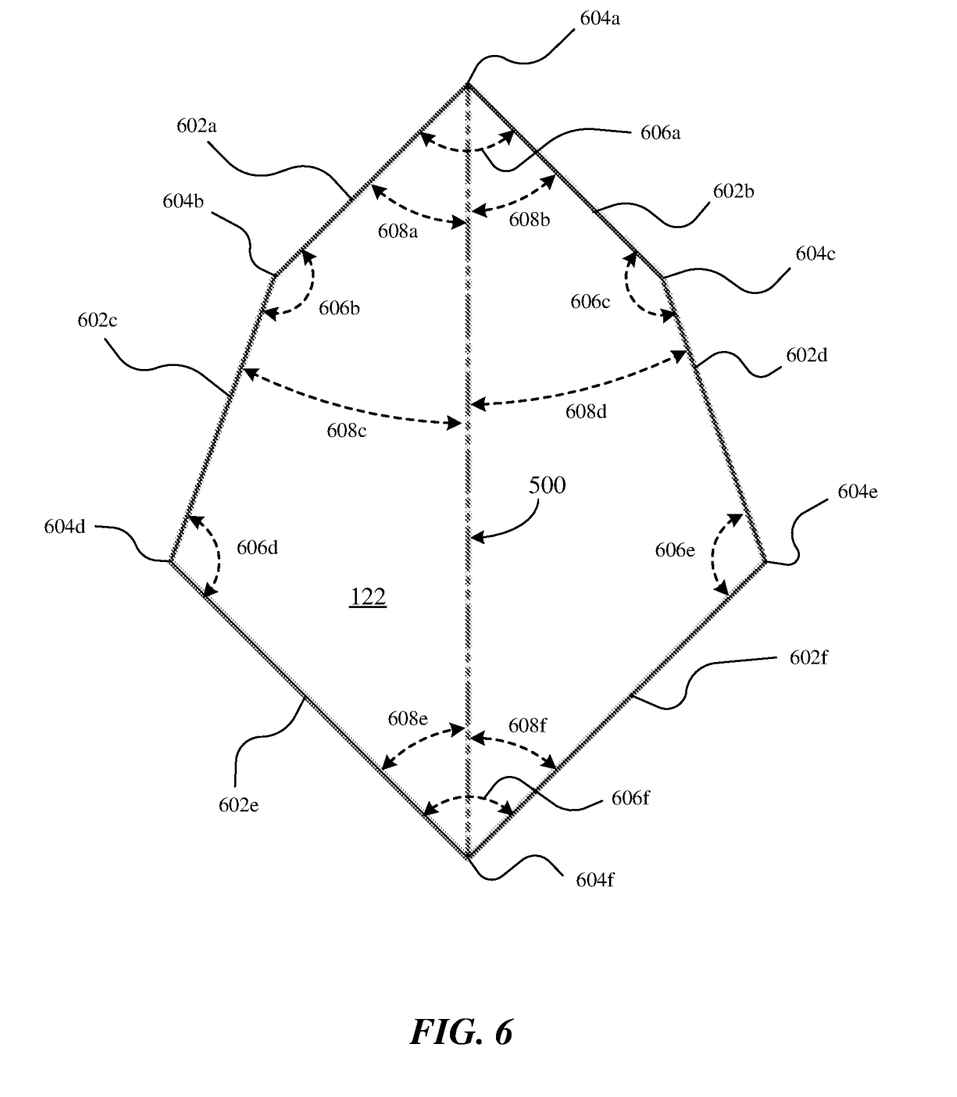

FIG. 6 further illustrates example cargo bay 122. In the example of FIG. 6, cargo bay 122 has a polygonal shape with six edges 602 and six vertices 604 and longitudinal centerline 500 of aircraft 100 intersects vertices 604*a* and 604*f* and their interior angles 606*a* and 606*f*. Longitudinal centerline 500 is shown for purposes of explanation only and is not necessarily a structure of aircraft 100. Interior angle 606*a* may be approximately 90°; interior angle 606*b* may be approximately 155°; interior angle 606*c* may be approximately 155°; interior angle 606*d* may be approximately 115°; interior angle 606*e* may be approximately 115°; and interior angle 606*f* may be approximately 90°. Angle 608*a* may be approximately 45°; angle 608*b* may be approximately 45°; angle 608*c* may be approximately 20°; angle 608*d* may be approximately 20°; angle 608*e* may be approximately 45°; and angle 608*f* may be approximately 45°.

Edge 602*a* may be approximately equal to edge 602*b*; edge 602*c* may be approximately equal to edge 602*d*; and edge 602*e* may be approximately equal to edge 602*f*. The length of edge 602*d* may be approximately 1.10 times the length of edge 602*b*, i.e., the ratio of the length of edge 602*b* to the length of edge 602*d* may be 1:1.10. The length of edge 602*f* may be approximately 1.53 times the length of edge 602*b*, i.e., the ratio of the length of edge 602*b* to the length of edge 602*f* may be 1:1.53. For example, edge 602*a* may be approximately 128.3 inches in length; edge 602*b* may be approximately 128.3 inches in length; edge 602*c* may be approximately 141.3 inches in length; edge 602*d* may be approximately 141.3 inches in length; edge 602*e* may be approximately 196.6 inches in length; and edge 602*f* may be approximately 196.6 inches in length. A straight-line interior distance between vertex 604*a* and 604*f* may be approximately 362.5 inches; a straight-line interior distance between vertex 604*d* and 604*e* may be approximately 278 inches; and a straight-line interior distance between vertex 604*b* and 604*c* may be approximately 229.7 inches. Although a particular BWB aircraft with a particular cargo bay with a particular shape and particular dimensions is described and illustrated, this disclosure contemplates any suitable BWB aircraft with any suitable cargo bay with any suitable shape with any suitable dimensions.

Figure 7:
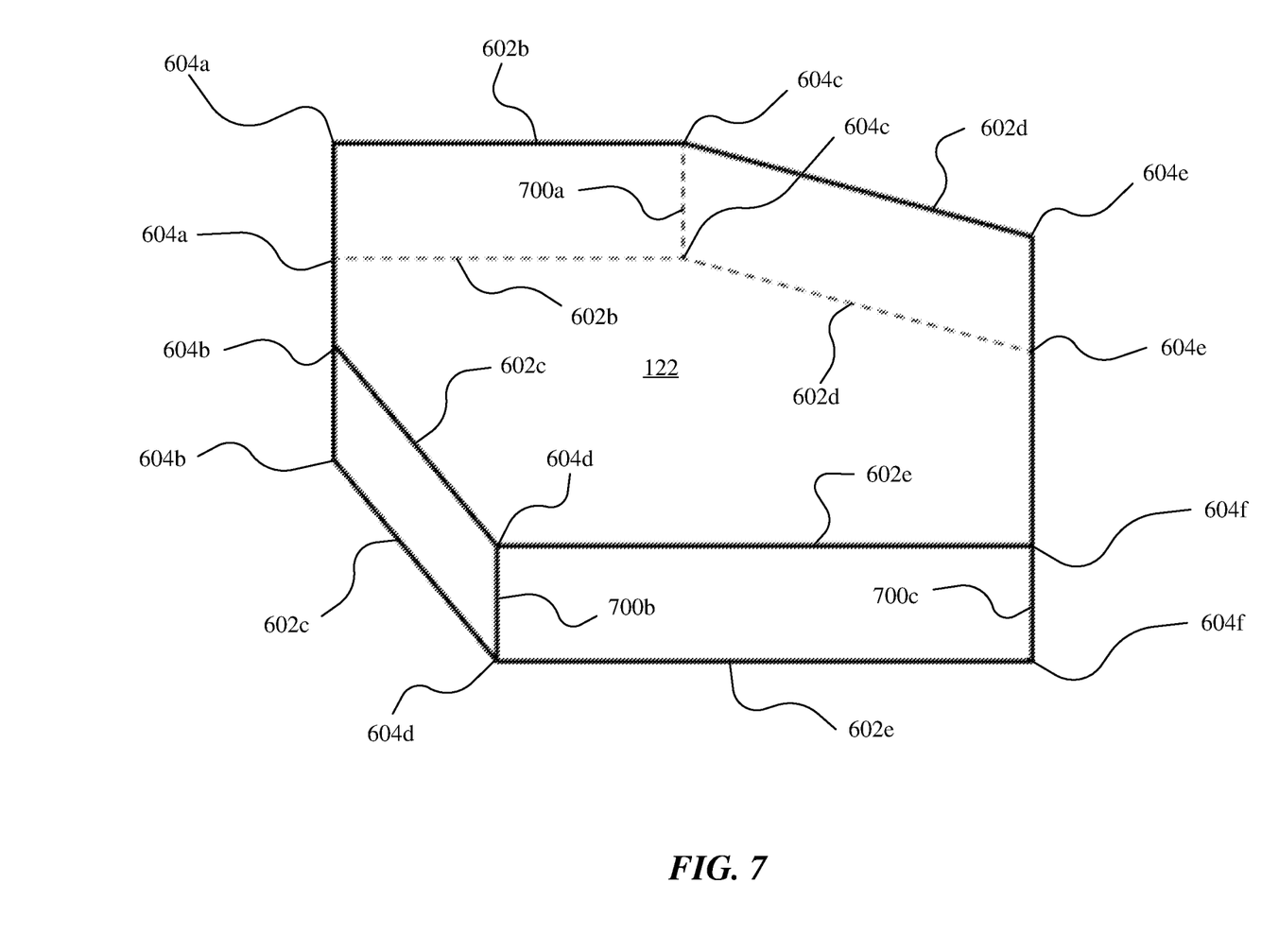

FIG. 7 further illustrates example cargo bay 122. FIG. 7 provides a three-dimensional isometric view of cargo bay 122 from above and toward the rear of aircraft 100. Cargo bay 122 may be approximately 52 inches tall, such that edges 700*a*, 700*b*, and 700*c* in FIG. 7 are each approximately 52 inches in height.

Figure 8:
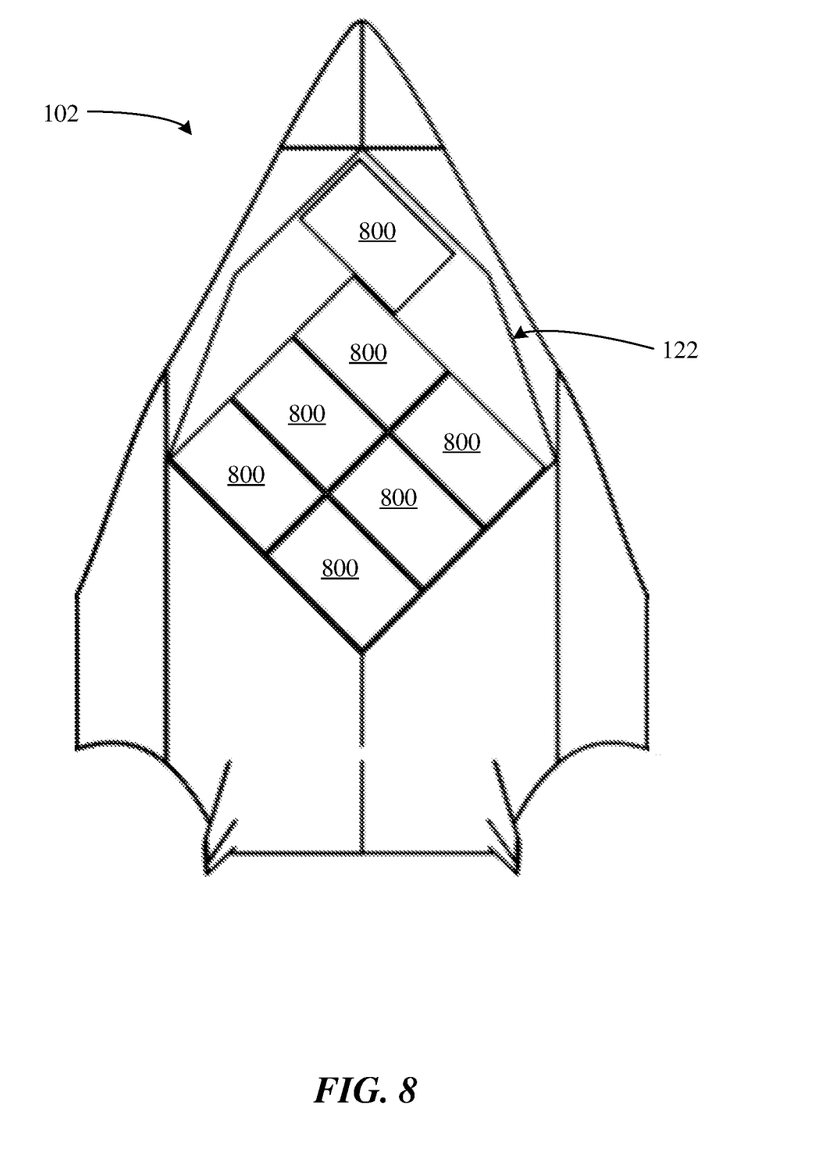
FIGS. 8 and 9 illustrate the example cargo bay loaded with example containers.
Figure 9:
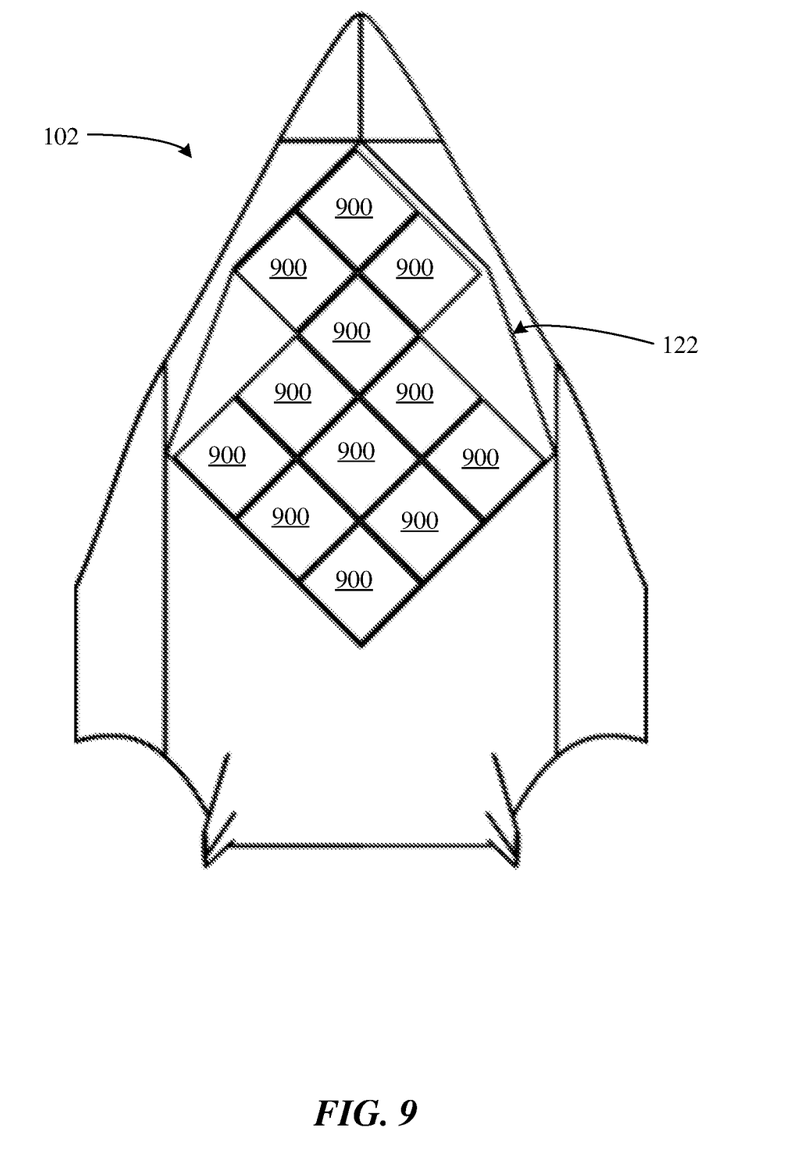

FIGS. 8 and 9 illustrate example cargo bay 122 loaded with example containers. The design of aircraft 100 may facilitate container loading and bulk loading. In the example of FIG. 8, cargo bay 122 is loaded with seven LD3-45 containers 800. An LD3-45 container 800 may have a base size of approximately 60.4 inches by approximately 61.5 inches; a height of approximately 45 inches; a roof length of approximately 96 inches; an internal volume of approximately 131 cubic feet; and an external volume of approximately 138 cubic feet. In the example of FIG. 9, cargo bay 122 is loaded with 12 modified LD3 containers 900. A modified LD3 container 900 may have a width of approximately 60.4 inches; a length of approximately 61.5 inches; a height of approximately 45 inches; an internal volume of approximately 96.7 cubic feet; and an external volume of approximately 98.7 cubic feet. Although particular numbers of particular containers with particular dimensions loaded in particular configurations in a particular BWB aircraft are described and illustrated herein, this disclosure contemplates any suitable number of any suitable containers with any suitable dimensions loaded in any suitable configuration in any suitable BWB aircraft.

Figure 10:
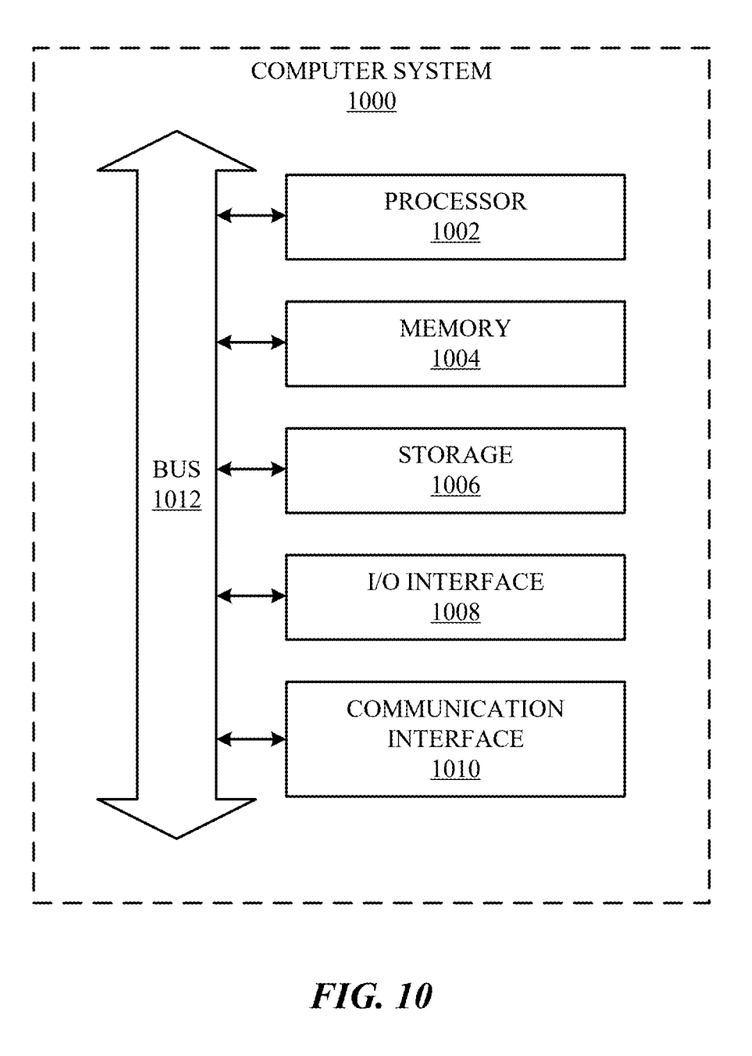
FIG. 10 illustrates an example computer system.

FIG. 10 illustrates an example computer system 1000. In particular embodiments, one or more computer systems 1000 on board aircraft 100 may carry out one or more functions of one or more sub-systems of aircraft 100. In particular embodiments, one or more computer systems 1000 not on board aircraft 100 (such as for example at a GCS) may carry out one or more functions of one or more sub-systems of aircraft 100. In particular embodiments, one or more computer systems 1000 at a GCS may carry out one or more functions of one or the GCS. In particular embodiments, one or more computer systems 1000 may perform one or more steps of one or more methods described or illustrated herein. In particular embodiments, one or more computer systems 1000 may provide functionality described or illustrated herein. In particular embodiments, software running on one or more computer systems 1000 may perform one or more steps of one or more methods described or illustrated herein or provide functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Additionally, the scope of this disclosure encompasses all advantages of the example embodiments described or illustrated herein that a person having ordinary skill in the art would comprehend. The scope of this disclosure is not limited to the particular advantages specifically described or illustrated herein.

Moreover, particular embodiments may provide all of the advantages described or illustrated herein, particular embodiments may provide some of the advantages described or illustrated herein, and particular embodiments may provide none of the advantages described or illustrated herein.

The invention claimed is:

1. An aircraft comprising:
   a blended wing body (BWB); and
   a cargo bay having a polygonal shape, wherein:
   a longitudinal centerline of the aircraft intersects a vertex of the polygonal shape and an interior angle of the vertex; and
   the cargo bay holds a plurality of cargo containers arranged such that each of one or more sides of each of the cargo containers is oriented at an acute, obtuse, or reflex angle relative to the longitudinal centerline of the aircraft.

2. The aircraft of claim 1, wherein the longitudinal centerline of the aircraft approximately bisects the interior angle of the vertex.

3. The aircraft of claim 1, wherein the polygonal shape comprises six edges.

4. The aircraft of claim 3, wherein:
   a first one of the edges and a second one of the edges form a first interior angle;
   the second edge and a third one of the edges form a second interior angle;
   the third edge and a fourth one of the edges form a third interior angle;
   the fourth edge and a fifth one of the edges form a fourth interior angle;
   the fifth edge and a sixth one of the edges form a fifth interior angle;
   the sixth edge and the first edge form a sixth interior angle; and
   the longitudinal centerline of the aircraft intersects the third interior angle and the sixth interior angle.

5. The aircraft of claim 4, wherein the longitudinal centerline of the aircraft approximately bisects the third interior angle and the sixth interior angle.

6. The aircraft of claim 4, wherein:
   the first interior angle is approximately 155°;
   the second interior angle is approximately 115°;
   the third interior angle is approximately 90°;
   the fourth interior angle is approximately 115°;
   the fifth interior angle is approximately 155°; and
   the sixth interior angle is approximately 90°.

7. The aircraft of claim 6, wherein:
   a length of the first edge is approximately equal to a length of the sixth edge;
   a length of the second edge is approximately equal to a length of the fifth edge;
   a length of the third edge is approximately equal to a length of the fourth edge;
   a ratio of the length of the first edge to the length of the second edge is approximately 1:1.10; and
   a ratio of the length of the first edge to the length of the third edge is approximately 1:1.53.

8. The aircraft of claim 7, wherein:
   the first and sixth edges are each approximately 128.3 inches long;
   the second and fifth edges are each approximately 141.3 inches long; and
   the third and fourth edges are each approximately 196.6 inches long.

9. The aircraft of claim 1, wherein the cargo bay is configured to hold a maximum of seven LD3-45 containers.

10. The aircraft of claim 1, wherein the cargo bay is configured to hold a maximum of 12 modified LD3 containers.

11. The aircraft of claim 1, further comprising a cargo door located on a left-hand side of the aircraft.

12. The aircraft of claim 1, wherein the aircraft is an unmanned aerial vehicle (UAV).

13. A method comprising:
    transporting cargo in an aircraft that comprises:
    a blended wing body (BWB); and
    a cargo bay having a polygonal shape, wherein:
    a longitudinal centerline of the aircraft intersects a vertex of the polygonal shape and an interior angle of the vertex; and
    the cargo bay holds a plurality of cargo containers arranged such that each of one or more sides of each of the cargo containers is oriented at an acute, obtuse, or reflex angle relative to the longitudinal centerline of the aircraft.

14. The method of claim 13, wherein the longitudinal centerline of the aircraft approximately bisects the interior angle of the polygonal shape.

15. The method of claim 13, wherein the polygonal shape comprises six edges.

16. The method of claim 15, wherein:
    a first one of the edges and a second one of the edges form a first interior angle;
    the second edge and a third one of the edges form a second interior angle;
    the third edge and a fourth one of the edges form a third interior angle;
    the fourth edge and a fifth one of the edges form a fourth interior angle;
    the fifth edge and a sixth one of the edges form a fifth interior angle;
    the sixth edge and the first edge form a sixth interior angle; and
    the longitudinal centerline of the aircraft intersects the third interior angle and the sixth interior angle.

17. The method of claim 16, wherein the longitudinal centerline of the aircraft approximately bisects the third interior angle and the sixth interior angle.

18. The method of claim 16, wherein
    the first interior angle is approximately 155°;
    the second interior angle is approximately 115°;
    the third interior angle is approximately 90°;
    the fourth interior angle is approximately 115°;
    the fifth interior angle is approximately 155°; and
    the sixth interior angle is approximately 90°.

19. The method of claim 18, wherein:
    a length of the first edge is approximately equal to a length of the sixth edge;
    a length of the second edge is approximately equal to a length of the fifth edge;
    a length of the third edge is approximately equal to a length of the fourth edge;
    a ratio of the length of the first edge to the length of the second edge is approximately 1:1.10; and
    a ratio of the length of the first edge to the length of the third edge is approximately 1:1.53.

20. The method of claim 19, wherein:
    the first and sixth edges are each approximately 128.3 inches long;
    the second and fifth edges are each approximately 141.3 inches long; and
    the third and fourth edges are each approximately 196.6 inches long.

21. The method of claim 13, wherein the cargo bay is configured to hold a maximum of seven LD3-45 containers.

22. The method of claim 13, wherein the cargo bay is configured to hold a maximum of 12 modified LD3 containers.

23. The method of claim 13, further comprising a cargo door located on a left-hand side of the aircraft.

24. The method of claim 13, wherein the aircraft is an unmanned aerial vehicle (UAV).

25. The aircraft of claim 1, wherein the plurality of cargo containers are arranged in the cargo bay such that each of one or more sides of each of the cargo containers is oriented at an angle of approximately 45°, 135°, 225°, or 315° relative to the longitudinal centerline of the aircraft.

26. The method of claim 13, wherein the plurality of cargo containers are arranged in the cargo bay such that each of one or more sides of each of the cargo containers is oriented at an angle of approximately 45°, 135°, 225°, or 315° relative to the longitudinal centerline of the aircraft.

* * * * *